United States Patent [19]

Pearce et al.

[11] 4,285,994
[45] Aug. 25, 1981

[54] PROCESS FOR PRODUCTION OF FREE FLOWING DUST-FREE PIGMENTS

[75] Inventors: Roy W. J. Pearce, Newcastle; John Carbert, Stoke-on-Trent; John P. K. MacDonald, Newcastle, all of England

[73] Assignee: Johnson, Matthey & Co., Limited, London, England

[21] Appl. No.: 165,643

[22] Filed: Jul. 3, 1980

Related U.S. Application Data

[63] Continuation of Ser. No. 934,091, Aug. 15, 1978, abandoned.

[30] Foreign Application Priority Data

Aug. 17, 1977 [GB] United Kingdom ............... 34543/77

[51] Int. Cl.$^3$ .............................................. B05D 7/00
[52] U.S. Cl. ..................................... 427/222; 106/272; 106/301; 106/306; 106/308 Q; 260/28.5 A; 260/42.21; 264/13; 264/117; 427/242; 428/407
[58] Field of Search ............ 106/272, 301, 306, 308 F, 106/308 Q, 308 M, 309; 427/212, 222, 242; 264/117; 428/407; 260/42.21, 42

[56] References Cited

U.S. PATENT DOCUMENTS

| Re. 28,361 | 3/1975 | Hahn et al. ........................... 428/407 |
| 3,054,751 | 9/1962 | Blake et al. ........................ 106/304 X |
| 3,353,974 | 11/1967 | Trimble et al. ................... 106/308 Q |
| 3,527,649 | 9/1970 | Sullivan ............................... 106/48 |
| 3,586,654 | 6/1971 | Lerman et al. ....................... 264/117 |
| 3,591,409 | 7/1971 | Aubrey et al. ........................ 428/407 |
| 3,723,153 | 3/1973 | Nagata et al. ........................ 427/222 |
| 3,767,444 | 10/1973 | Zeisberger ...................... 260/28.5 A |
| 3,778,288 | 12/1973 | Ridge et al. ............................ 106/309 |
| 3,905,937 | 9/1975 | Khanna ............................. 260/42.14 |
| 4,002,706 | 1/1977 | Pretorius ............................... 264/13 |
| 4,004,940 | 1/1977 | Cormier ............................. 260/42.21 |
| 4,025,690 | 5/1977 | Nanni et al. ........................... 428/407 |
| 4,041,194 | 8/1977 | Jenkins ............................. 260/28.5 A |
| 4,116,897 | 9/1978 | Huszar et al. .................... 260/28.5 A |
| 4,154,622 | 5/1979 | Momoi et al. ...................... 106/308 F |
| 4,158,571 | 6/1979 | Lynch et al. ...................... 106/272 X |
| 4,208,213 | 6/1980 | Muller et al. .................. 260/42.21 X |
| 4,230,501 | 10/1980 | Howard et al. ................... 106/308 F |
| 4,235,641 | 11/1980 | Engelmann et al. ............ 106/308 M |

FOREIGN PATENT DOCUMENTS

| 2318635 | 11/1974 | Fed. Rep. of Germany ....... 106/308 F |
| 2811922 | 9/1979 | Fed. Rep. of Germany . |
| 1411967 | 8/1965 | France ................................... 106/272 |
| 1397403 | 6/1975 | United Kingdom ..................... 427/212 |

OTHER PUBLICATIONS

Chemical Processing For Operating Management—"Pigment Bonded to Polystyrene in Minutes"—Sep. 16, 1966, p. 103.

*Primary Examiner*—Helen M. McCarthy
*Attorney, Agent, or Firm*—Cushman, Darby & Cushman

[57] ABSTRACT

This invention relates to novel pigment compositions and processes of making the same. The pigments of the present invention are free-flowing and a process for their production comprises a process for the production of a free-flowing pigment composition comprising tumbling together a finely divided wax composition as herein defined with a powdered pigment for a time sufficient for substantialy all of the pigment to be coated onto or to be absorbed by the wax. Specifically, a pigment in accordance with the invention comprises a free-flowing nucleated pigment composition comprising a substantially spherical particulate spray-chilled wax composition (as herein defined) having coated thereon and partially absorbed thereinto a pigment in powdered form, the said pigment being present to the extent of 50% by weight or more.

2 Claims, No Drawings

PROCESS FOR PRODUCTION OF FREE FLOWING DUST-FREE PIGMENTS

This is a continuation, of application Ser. No. 934,091 filed Aug. 15, 1978, now abandoned.

This invention relates to novel compositions of matter containing colorants and to novel processes for their production.

Because of problems associated with dust from finely divided powders it is frequently the case that pigment compositions are preferred in pellet or granular form. Many pigments are, however, only produced in granulated form with difficulty.

Further problems frequently experienced in handling large quantities of powders are caking, and in machinery, bridging and clogging.

It is an object of this invention to produce low-dust pigment compositions, which may in some instances be dust free, which have good powder flow and handling characteristics, which may be used for coloring and decorating purposes in the plastics or ceramics industries. These low-dust compositions are particularly suitable for use with metering device.

According to one aspect of the present invention a process for the production of a free-flowing pigment composition comprises tumbling together a finely divided wax composition as herein defined with a powdered pigment for a time sufficient for substantially all of the pigment to be coated onto or to be absorbed by the wax.

Temperatures which may be used range from ambient to 200° C. The finished granulated product is in many cases in a "clean to touch" condition in that substantially all of the pigment is absorbed by the polymer during the granulation process.

Preferably the powdered pigment is present to the extent of 70%–95% by weight. Additionally, an oil or surfactant may be employed with the wax composition in the tumbling process. The presence of the oil or surfactant may be preferred with those pigments which are normally difficult to granulate but is not necessarily essential. Up to 20% by weight of oil or surfactant may be employed. The wax plus oil or surfactant is therefore present to an extent of 5–30% by weight of the total system with a figure of between 5–20% being preferred.

The wax composition preferably comprises spherical particles of spray chilled wax or ground waxes of suitable size distribution ranging in diameter from 100-/2000 microns. On coating or absorption with pigment the final product is still approximately spherical and ranges in size from 0.2 mm up to about 5 mm in diameter.

In this specification the term wax composition should be interpreted to include the following:

DEFINITION OF WAX FOR USE IN HOT AND COLD GRANULATION

Chemically the wax binder should be either organic polymeric (natural or synthetic) in nature or organic non-polymeric of cationic, non-ionic or anionic nature.

As a polymer, it may be addition or condensation type. Examples of addition types are the polyolefins (polyethylene, polypropylene, polybutylene), polyvinyl chloride, polyvinyl acetate, polyacrylonitrile, polystyrene, polymethyl methacrylate, polybutadiene and copolymers thereof.

Examples of condensation types are the polyesters and polyamides.

The wax binder may be a non-polymeric material based on long-chain fatty alcohols or fatty acids. These may be esterified or otherwise substituted, for example arylated or ethoxylated, sulphonated or aminated (amines and amides).

The wax binder should have a melting point of between 50° C. and 250° C. and melt viscosity (Brookfield at 140° C.) of between 10 and 30,000 cps. It should be in the form of a powder having a size or size spread no finer than 50 $\mu$m and no greater than 5000 $\mu$m. The binder should be stable at thermoplastic processing temperatures of up to 300° C. for up to 30 minutes.

In this specification the term oil or surfactant should be interpreted to include the following composition:

Any oily liquid capable of wetting out the surface of the substrate with viscosity between 1.0 and 30,000 centistokes being stable at the normal wax composition processing temperatures and compatible with the wax composition in which the pigment is to be used.

Such liquids include dimethyl siloxane polymers and related silicone fluids, hydrocarbon oils, polyethylene glycols with molecular weights ranging from 200 to 400 and compounds formed by the esterification of a primary alcohol with a fatty acid ranging from $C_3$ to $C_{20}$ such as butyl stearate.

In certain instances it has been found preferable to use liquid surfactants of the anionic, cationic or non-ionic type.

Anionic surfactants include sulphonated fatty acid alcohols and other sulphonated alkyl and aryl compounds and triethanolamine compounds of fatty acids.

Suitable cationic surfactants include long-chain amines, diamines, quaternary ammonium salts and cyclic amines.

Non-ionic surfactants include ethylene oxide condensates of fatty acids, fatty alcohols and alkyl phenols.

Also included are the oxyethylene sorbitol fatty acid esters, polyethylene glycol fatty acid esters, propylene glycol fatty acid esters and glycerol mono esters of fatty acids.

The term surfactant or surface active agent is known in the art and refers to compounds having a functional group in an organic molecule such that by the addition of such compounds the surface tension between solid and liquid is greatly reduced.

By operating the process according to the invention it is possible to produce granulates having much higher pigment concentration (either nucleated by the wax composition substrate without heat, or absorbed into the wax composition with the use of heat) than has heretofore been possible. For example by the use of a prior art technique such as melting wax and stirring in the powdered pigment it is not possible to obtain a dispersion of pigment in wax greater than 50% by weight.

According to a second aspect of the present invention, therefore, a free-flowing nucleated pigment composition comprises a substantially spherical particulate spray-chilled wax composition (as herein defined) having coated thereon and partially absorbed thereinto a pigment in powdered form, the said pigment being present to the extent of 50% by weight or more. Preferably pigment is present to the extent of 70% by weight and may be present to the extent of 95% by weight. Preferably also present, but not essentially present is one or more surface active agents or an oil. Up to 5% by weight surface active agent or oil may be present although not more than 1% by weight is usually preferred.

According to a third aspect of the present invention a free-flowing non-nucleated pigment composition comprises a substantially spherical particulate spray-chilled wax composition (as herein defined) having evenly dispersed therein a pigment in powdered form, the said pigment being present to the extent of 50% by weight or more. Preferably pigment is present to the extent of 70% by weight and may be present to the extent of 95% by weight. Preferably also present, but not essentially present is one or more surface active agents or an oil e.g. a hydrocarbon oil. Up to 5% by weight surface active agent or oil may be present although not more than 1% by weight is usually preferred.

Pigment compositions according to the invention may be used to pigment thermoplastic polymers, or for the provision of special speckle effects in ceramic use e.g. in glazes. For example in heat treated granulates may be incorporated into a slip or glaze slurry used for the decoration of ceramic articles. Depending upon the concentration of pigment composition in this slip, a speckled effect of varying intensity will be produced when the glaze is dried and fired. The wax composition plus oil or surfactant oxidizes away leaving local concentrations of color. The firing temperature for this operation is preferably within the range 500-1400° C.

By varying the nature of the wax composition it is possible to use the invention in a more general nature for the dosing or metering of a fine particulate substance into a medium which would not necessarily absorb the said substance initially in a satisfactory manner.

A hydrophilic polymer could be used as the wax composition with satisfactory alteration of the nature of the surfactant, whereby the granulates become water dispersible. These granulates can be used for the pigmentation of aqueous systems requiring low dust, good powder flow, or controlled release properties.

EXAMPLE 1

100 parts by weight of finely ground, calcined, cadmium sulphide yellow pigment is added to a mixture containing 5 parts by weight of spray chilled polyethylene wax having an average particle size of between 300 and 400μ and 1 part of polymeric glycol having a molecular weight between 200 and 400.

The mixture is placed in a rotating vessel and rotated at between 10 and 120 rpm dependent upon vessel capacity. The process is continued and within about 2 hours complete granulation occurs and a free-flowing clean product is obtained.

Increase in bulk density of the granulated powder is nominally 20% w/v.
Increase in flow rate of the granulated powder was from 60 gms in 112 seconds to 60 gms in 9.5 seconds.
Method —flow through 6.0 mm funnel.
Decrease in available dust nominally 25%.

EXAMPLE 2

100 parts by weight of finely ground, calcined cadmium sulpho-selenide red pigment are added to 15 parts by weight of ground polystyrene having an average particle size of between 300 and 500μ and 3 parts by weight of a dimethyl siloxane fluid having a viscosity of 200 centistokes.

If the procedure of Example 1 is carried out a granular, free-flowing product is obtained, also within two hours.

Increase in bulk density of the granulated powder is nominally 20% w/v.
Increase in flow rate of the granulated powder was from 60 gms in 142 seconds to 60 gms in 11.0 seconds.
Decrease in available dust nominally 25%.

EXAMPLE 3

100 parts by weight of fired cadmium sulphide yellow pigment in a finely milled state are added to 13 parts by weight of spray-chilled polyethylene wax having an average particle size of 300-400μ. The whole is placed in a jacketed rotating vessel and rotated until mixed. Hot oil is circulated in the jacket at a temperature in excess of 120° C. Rotation is carried out at between 10 and 120 rpm, dependent on vessel capacity. Granulation can commence within a few minutes and be complete in up to 1 hour. The time taken is frequently less at this temperature. Then granulation occurs, the product is discharged into a cool rotatable vessel which is turned until the granular material is cool.

The bulk density remains nominally unchanged. The increase in flow rate was from 60 gms in 130 seconds to 60 gms in 20 seconds. Decrease in available dust nominally 94.4%.

EXAMPLE 4

100 parts by weight of a green pigment are blend mixed in the following ratio:

| | |
|---|---|
| 138 parts | Berytes |
| 56 parts | Cadmium Sulphide Yellow |
| 34 parts | Phthalocyanine Green |

15 parts by weight of polyethylene wax are premixed with 3 parts by weight of dimethyl siloxane fluid as described in Example 2. The pre-mixture is added to the pigment blend and the product is rotated cold and then hot and finally discharged in the manner described in Example 3, giving a clean free-flowing product in less than one hour.

The bulk density remains nominally unchanged. The increase in flow rate was from 60 gms in 108 seconds to 60 gms in 25 seconds. Decrease in available dust nominally 93.7%.

EXAMPLE 5

100 parts by weight of a brown manganese based oxide ceramic stain is added to 12 parts by weight of a polyethylene wax described in Example 3. By use of the procedure described in Examples 3 and 4 successful granulation of the product to form a non-nucleated free-flowing composition is achieved.

Increase in bulk density of the hot granulated powder is nominally 20%.
Increase in flow rate of the hot granulated powder was from 60 gms in 102 seconds to 60 gms in 29 seconds.
Decrease in available dust was nominally 18%.

We claim:
1. A process for the production of a free-flowing and relatively dust-free pigment composition which comprises tumbling together in the presence of of up to 5% by weight of an oil or surfactant selected from the group consisting of dimethyl siloxane polymers and silicone fluids, hydrocarbon oils, polyethylene glycols with molecular weights ranging from 200 to 400 and compounds formed by the esterification of a primary alcohol with a fatty acid ranging from $C_3$ to $C_{20}$ and having a viscosity between 1.0 and 30,000 centistokes (1) a finely divided spray chilled polymeric wax binder consisting essentially of substantially spherical particles of polymer selected from the group consisting of polyolefin, polyvinyl chloride, polyvinyl acetate, polyacrylonitrile, polystyrene, polymethylmethacrylate, polybutadiene and copolymers thereof having a particle size distribution within the range 50–5000 microns diameter and (2) a powdered pigment present in an amount between 70 and 95% by weight, continuing the tumbling for a time sufficient for substantially all of the pigment to be coated onto or to be absorbed by the polymeric wax binder as substrate to form substantially spherical particles ranging in size from 0.2 mm up to 5.0 mm in diameter.

2. A process according to claim 1 wherein tumbling is carried out at a temperature falling within the range from ambient to 200° C.

* * * * *